(12) United States Patent
Wigington et al.

(10) Patent No.: US 11,802,006 B2
(45) Date of Patent: Oct. 31, 2023

(54) PALLET CENTERING DEVICE

(71) Applicant: UNITED STATES GYPSUM COMPANY, Chicago, IL (US)

(72) Inventors: Dakota Wigington, Watonga, OK (US); Cody Lewis, Geary, OK (US); Gary Bowers, Fairview, OK (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 71 days.

(21) Appl. No.: 17/453,766

(22) Filed: Nov. 5, 2021

(65) Prior Publication Data

US 2023/0141239 A1 May 11, 2023

(51) Int. Cl.
*B65G 47/28* (2006.01)
*B65G 13/11* (2006.01)
*B65G 43/08* (2006.01)

(52) U.S. Cl.
CPC ............ *B65G 47/28* (2013.01); *B65G 13/11* (2013.01); *B65G 43/08* (2013.01); *B65G 2811/0621* (2013.01)

(58) Field of Classification Search
None
See application file for complete search history.

(56) References Cited

U.S. PATENT DOCUMENTS

| 3,944,045 A | 3/1976 | Higgins |
| 4,148,400 A | 4/1979 | Cross |
| 4,302,919 A | 12/1981 | Hartness |
| 4,976,766 A * | 12/1990 | Kuster ..................... C03B 35/14 65/289 |
| 5,353,910 A | 10/1994 | Harris et al. |
| 5,607,282 A * | 3/1997 | Brannen ............. B65G 59/062 414/797.6 |

(Continued)

FOREIGN PATENT DOCUMENTS

| CN | 206569672 U | 10/2017 |
| CN | 111483754 A | 8/2020 |

(Continued)

OTHER PUBLICATIONS

International Search Report and Written Opinion received for PCT/US2022/078974, dated Feb. 14, 2023.

*Primary Examiner* — Kavel Singh
(74) *Attorney, Agent, or Firm* — Greer, Burns & Crain, Ltd.; Philip T. Petti; Pradip Sahu

(57) ABSTRACT

A pallet centering device includes a frame upon which is mounted a plurality of conveyor rollers, the conveyor rollers mounted transverse to a direction of pallet travel. A first pallet pusher unit and a second pallet pusher unit are associated with respective sides of the support frame, both for reciprocal movement transverse to the direction of pallet travel. The first and second pallet pusher units each have pallet pusher members configured for engaging respective sides of a pallet. At least one transverse U-channel rail is mounted to the support frame beneath the conveyor rollers and defining a channel track. Each first and second pallet pusher unit has at least one depending bearing mount aligned with the channel track and provided with a bearing rotatably engaging the channel track. A drive assembly moves the first and second pallet pusher units reciprocally for centering the pallet located on the conveyor rollers.

19 Claims, 7 Drawing Sheets

(56) References Cited

U.S. PATENT DOCUMENTS 5,927,469 A     7/1999   Dunifon et al.
5,944,477 A     8/1999   Shill

FOREIGN PATENT DOCUMENTS

| | | |
|---|---|---|
| CN | 212424438 U | 1/2021 |
| CN | 113086576 A | 7/2021 |
| CN | 214030683 U | 8/2021 |
| DE | 830270 C | 2/1952 |
| KR | 100592103 B1 | 6/2006 |

\* cited by examiner

PALLET CENTERING DEVICE

BACKGROUND

The present invention relates to pallet handling equipment associated with packaging systems, particularly equipment designed for packaging bags of particulate material stacked on the pallets, and more specifically to an improved device for centering loaded pallets on a conveyor line for film-wrapping.

Particulate materials, including building materials such as cement, plaster, mortar, drywall joint compound and the like, are conventionally packaged in paper bags ranging in weight from 25 to 100 pounds. Conventionally, the bags of a particular product and size are stacked together on a pallet. The size and shape of the pallet changes according to the type and size of bag, and the desired bag stack weight. To reduce damage from shipping or exposure to environmental moisture, the stacked pallets are wrapped in plastic film. A suitable pallet wrapping apparatus is manufactured by BEUMER Maschinenfabrik GmbH & Co. KG based in Beckum, Germany. The film wrapping apparatus, sold under the trademark BEUMER stretch Hood®, is designed so that optimal results are achieved when the stacked pallet being wrapped is centered on the respective conveyor table or line.

As bagged product changes, either by the size of the bag or the contents, the respective pallets carrying such stacked bags will behave differently on the conveyor line. Thus, a pallet centering device needs the capability to adjust the centering action for different sizes and weights of pallets. In some factories, production lines of various sized bags and pallets are fed from respective, product-exclusive feeder conveyors to a central conveyor that feeds the bags to the film wrapping apparatus.

While devices are known for mechanically centering stacked pallets on conveyor tables, in many cases, the stacked pallets of paper bags of the above-described particulate building materials often weigh at least as much as 4,000 pounds. Operators have experienced the inability of existing pallet centering devices to accommodate various sizes, weights and/or shapes of stacked pallets. In addition, operators have also noted equipment failure of conventional pallet centering devices after extended exposure to such heavy pallets.

Accordingly, there is a need for an improved pallet centering device that is configured for reliably handling relatively heavy pallets for transmitting the pallets to a film wrapping apparatus.

SUMMARY

The above-listed need is met or exceeded by the present pallet centering device, which features an enhanced support system for accommodating relatively heavy pallets. Included in the device is a frame to which are mounted opposed, first and second pallet pusher units, each preferably extending the length of a special section of conveyor rollers located on an upper surface of the device. Preferably, the conveyor rollers are oriented transverse to the direction of travel of the pallet down a conveyor line towards pallet film wrapping apparatus. Each of the pallet pusher units includes a support plate located beneath the conveyor rollers, and has depending bearing mounts that hold preferably flanged roller bearings within at least one, transverse "U"-channel rail. The at least one "U"-channel rail is located on the support frame below the conveyor rollers. Also associated with the device is a drive system for reciprocally moving the first and second pallet pusher units towards and away from a subject pallet located on the conveyor rollers. Each of the first and second pallet pusher units is connected, as by a depending foot, to a respective power transmission member such as a drive belt or chain. The direction of rotation of a motor pulley to which the transmission members are attached causes the pallet pusher units to move towards or away from each other.

As such, as the pallet pusher units move towards each other, in the act of centering a subject pallet on the conveyor rollers, the respective pallet pusher units travel along the "U"-channel rail, which readily supports the heavy weight of the pallets. By using flanged roller bearings, the alignment of the roller bearings within the channel rail is maintained.

Another feature of each of the pallet pusher units is a biased control flap constructed and arranged so that once the subject pallet contacts the control flap, the flap is pressed against a corresponding pallet pusher member, which generates a signal sent to a control unit which is also connected to the motor controlling movement of the pallet pusher units. Preferably, each of the pallet pusher units has a plurality of such control flaps.

More specifically, a pallet centering device for use with a pallet conveyor line that is connected to a pallet film wrapping apparatus is provided, the pallet centering device includes, a support frame with an upper surface upon which is mounted a plurality of conveyor rollers, the support frame including a pallet entry end, an opposite pallet exit end, a first side and an opposite second side, the conveyor rollers being mounted transverse to a direction of pallet travel from the pallet entry end to the pallet exit end.

A first pallet pusher unit is associated with the first side of the support frame for reciprocal movement transverse to the direction of pallet travel, and a second pallet pusher unit is associated with the second side of the support frame for reciprocal movement transverse to the direction of pallet travel. The first and second pallet pusher units each have pallet pusher members configured for engaging respective sides of a pallet located on the conveyor rollers. At least one transverse U-channel rail is mounted to the support frame beneath the conveyor rollers and defining a channel track.

Each first and second pallet pusher unit has at least one depending bearing mount constructed and arranged for alignment with the channel track, and each bearing mount is provided with a track bearing rotatably engaging the channel track.

A drive assembly is associated with the support frame and is connected to the first and second pallet pusher units for moving the units reciprocally relative to the direction of travel for centering the pallet located on the conveyor rollers.

In an embodiment, each pallet pusher unit has a pair of depending bearing mounts having track bearings for engaging the channel track, and preferably, each track bearing has a flanged end for enhancing alignment in the channel track.

In a preferred embodiment, each pallet pusher member has a control flap constructed and arranged so that upon impact with the pallet, the flap depresses against the pallet pusher member, generating a signal indicating pallet contact. The device preferably further includes a control unit connected to the pallet pushers and to the drive assembly and configured for controlling movement of the pallet pusher units for achieving centering of the pallet on the conveyor rollers.

In an embodiment, the pallet pusher units each have openings for accommodating the conveyor rollers so that the pallet pusher units are movable transversely relative to the conveyor rollers. Also, the conveyor rollers are arranged in groups, with spaces defined between the groups in the direction of pallet travel, and the pallet pusher units are provided with supports extending in the spaces. Preferably, the supports are connected to a pusher support plate disposed beneath the conveyor rollers.

In a preferred embodiment, the drive assembly includes a motor associated with the support frame and connected to first and second power transmission members, each of which is associated with one of the first and second pallet pusher units, so that energization of the motor causes the reciprocal movement of the pallet pusher units relative to the conveyor rollers. Preferably, the power transmission member is one of an endless belt and a chain, and the first and second pallet pusher units each have a foot secured to the respective power transmission member.

In another embodiment, a pallet centering device is provided for use with a pallet conveyor line that is connected to a pallet film wrapping apparatus, and includes a support frame with an upper surface upon which is mounted a plurality of conveyor rollers, the support frame including a pallet entry end, an opposite pallet exit end, a first side and an opposite second side, the conveyor rollers being mounted transverse to a direction of pallet travel from the pallet entry end to the pallet exit end.

A first pallet pusher unit is associated with the first side of the support frame for reciprocal movement transverse to the direction of pallet travel, and a second pallet pusher unit associated with the second side of the support frame for reciprocal movement transverse to the direction of pallet travel. The first and second pallet pusher units each have pallet pusher members configured for engaging respective sides of a pallet located on the conveyor rollers. At least one transverse U-channel rail is mounted to the support frame beneath the conveyor rollers and defines a channel track.

Each first and second pallet pusher units have at least one depending bearing mount constructed and arranged for alignment with the channel track, and each bearing mount is provided with a track bearing rotatably engaging the channel track. The pallet pusher units each have a pusher support plate disposed beneath the conveyor rollers, and supports associated with the support plate and extending between spaces separating the conveyor rollers.

In an embodiment, a drive assembly is associated with the support frame and is connected to the first and second pallet pusher units for moving the units reciprocally relative to the direction of travel for centering the pallet located on the conveyor rollers. The drive assembly includes a motor connected to first and second power transmission members, and each pallet pusher unit includes a foot configured for attachment to the respective power transmission member.

DETAILED DESCRIPTION

Figure 1:
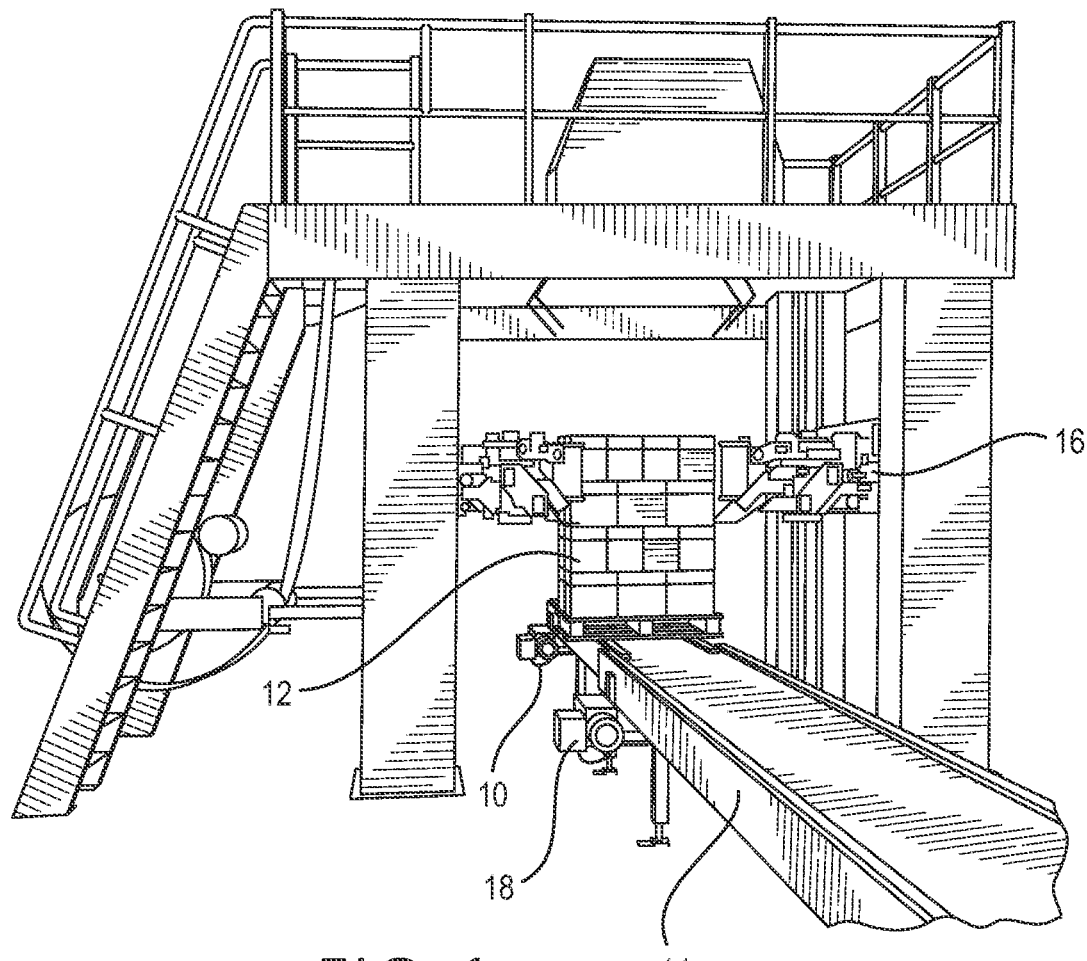
FIG. 1 is a front view of a pallet conveyor line extending to a prior art pallet film wrapping apparatus.
Figure 2:
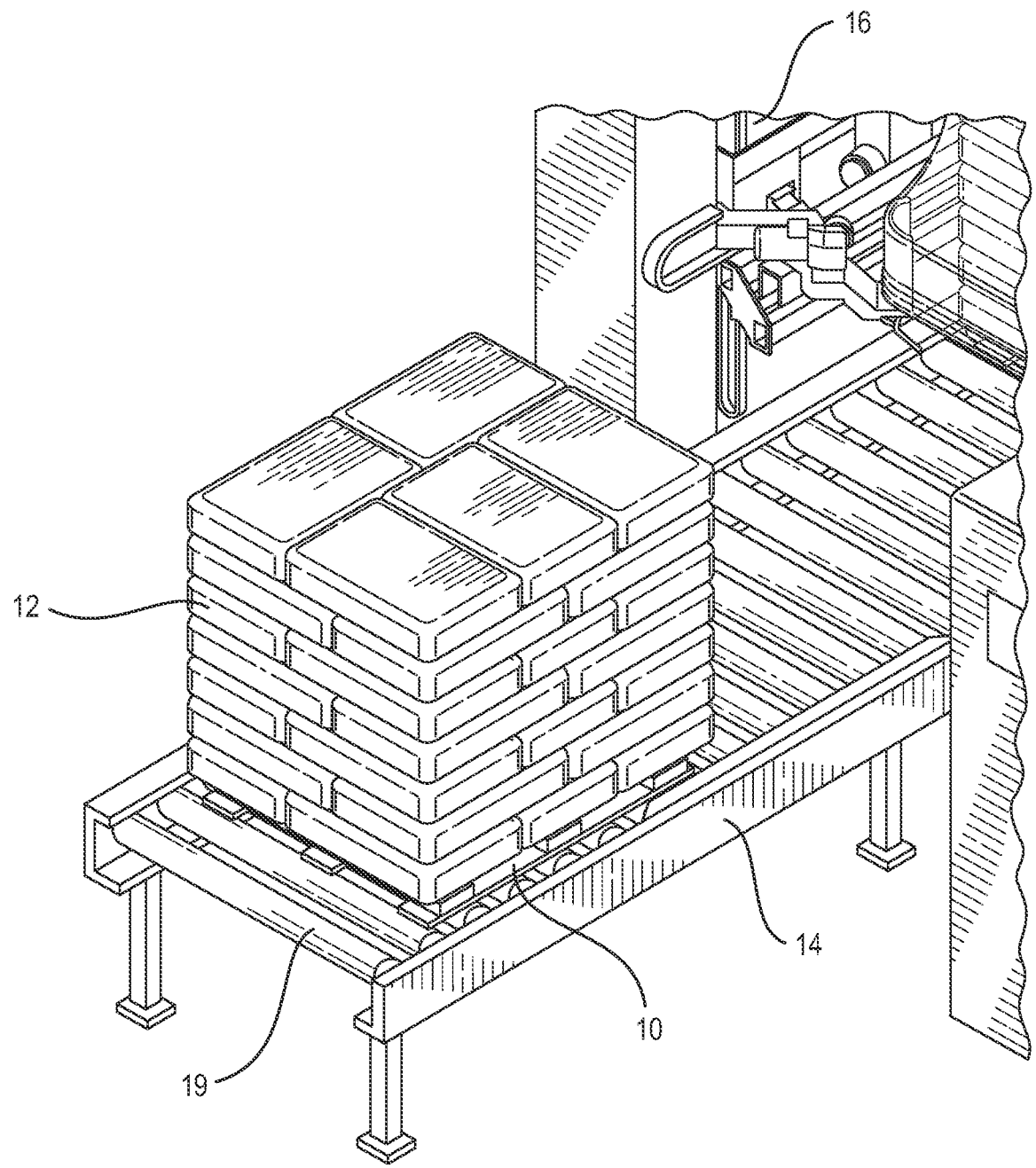
FIG. 2 is a fragmentary, top perspective view of a pallet with stacked bags entering the prior art pallet film wrapping apparatus.

Referring now to FIGS. 1 and 2, a known arrangement of a pallet 10 bearing a stack 12 of loaded cartons (FIG. 1) and bags (FIG. 2), such as of the type filled with particulate material, such as construction material, such as wallboard joint compound, cement, plaster, mortar or the like, is shown traveling down a conveyor table or line 14 feeding to a film wrapping apparatus 16. Other types of bagged particulate products are contemplated. A suitable pallet wrapping apparatus 16 is manufactured by BEUMER Maschinenfabrik GmbH & Co. KG based in Beckum, Germany. The film wrapping apparatus 16, sold under the trademark BEUMER stretch Hood®, is configured for stretching a protective plastic film over the stack 12 to prevent impact or moisture damage to the stack during shipping and storage. Further, the apparatus 16 is designed so that optimal results are achieved when the stacked pallet 12 being wrapped is centered on the respective conveyor line 14. Included on the conveyor line 14 is a motor drive 18 that powers a series of rollers 19 suitable for moving the pallets 10 as desired.

Figure 3:
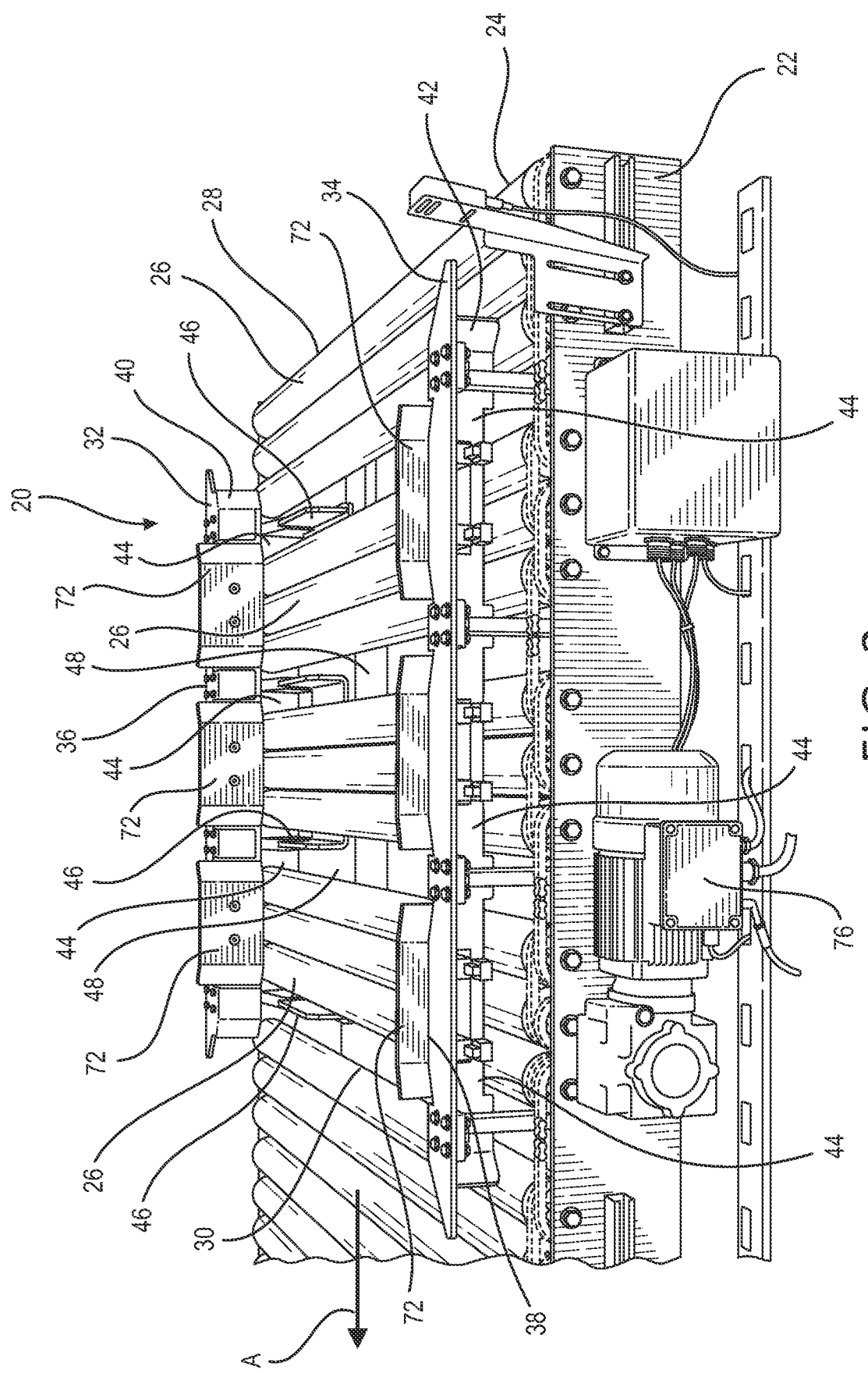
FIG. 3 is a top side perspective view of the present pallet centering device.
Figure 4:
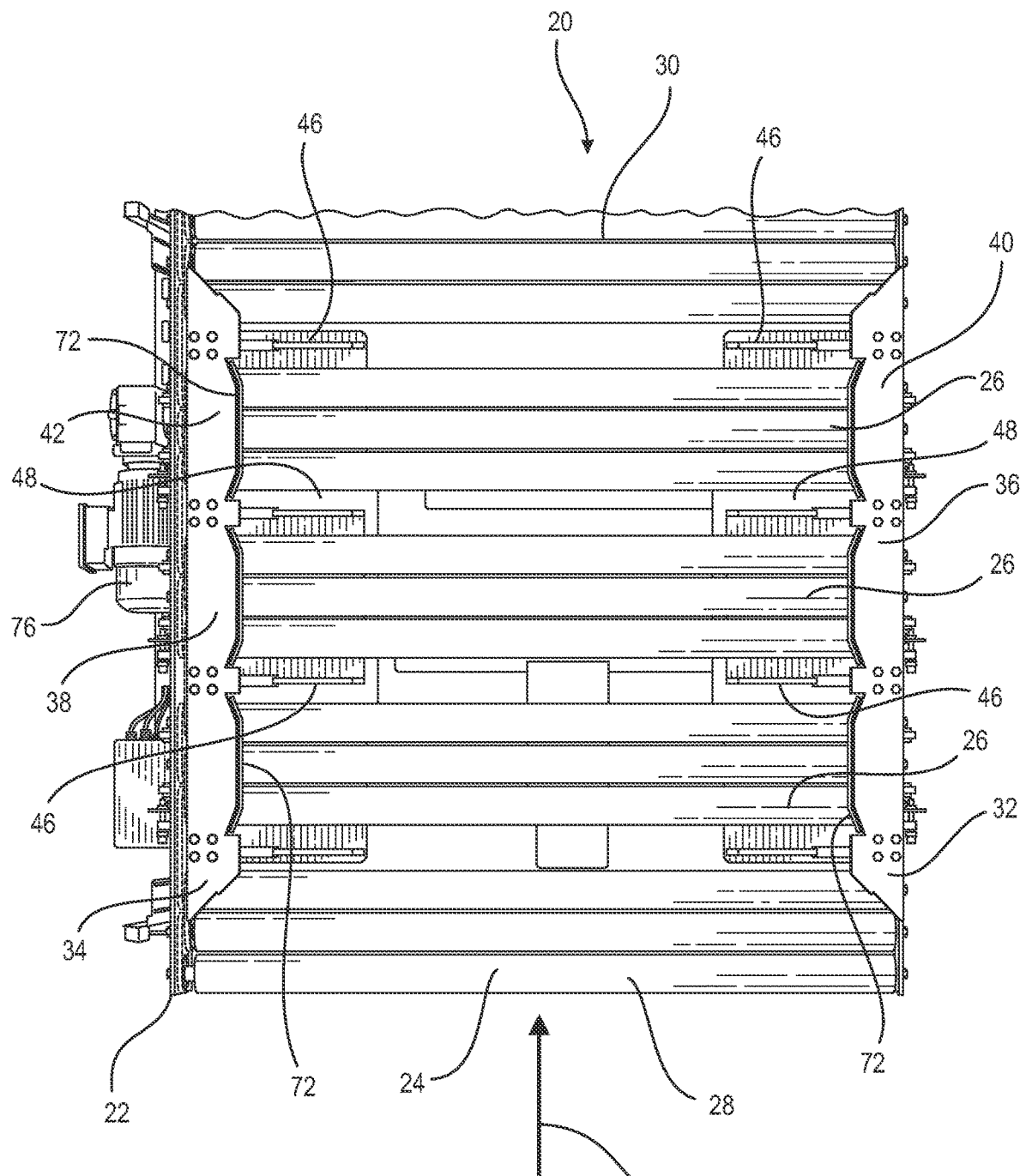
FIG. 4 is an overhead plan view of the pallet centering device of FIG. 3.
Figure 5:
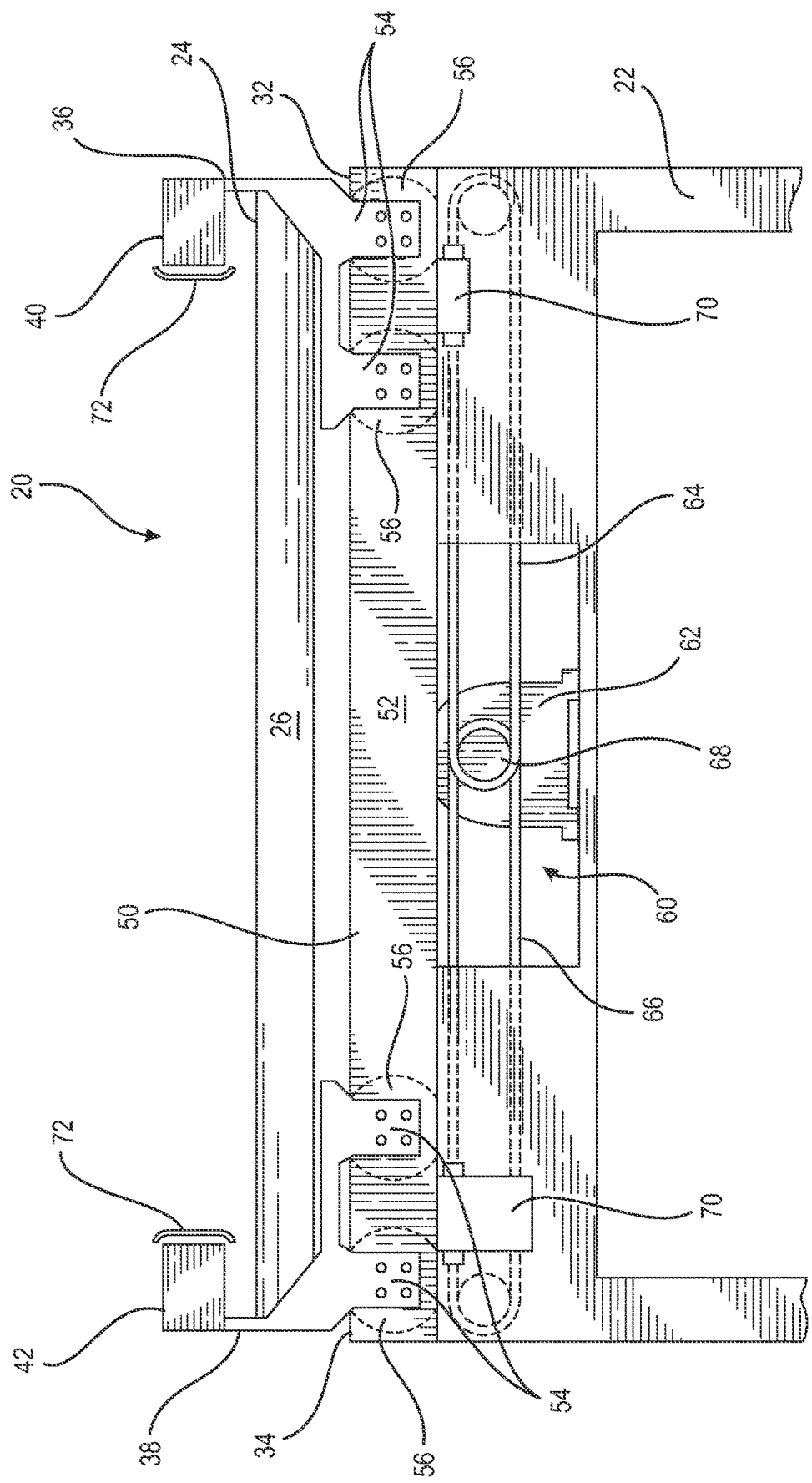
FIG. 5 is a front view of the present pallet centering device.

Referring now to FIGS. 3-5, a pallet centering device is generally designated 20, and is constructed and arranged to center pallets 10 travelling down the conveyor line 14 so that the film wrapping apparatus 16 works most effectively. Included on the device 20 is a support frame 22 dimensioned to have a common height with the conveyor line 14 to avoid disruption of the flow of pallets 10. It is preferred that the support frame 22 is made of heavy duty steel or the like, preferably ½ inch thick, and is positioned along the conveyor line 14 in fairly close proximity to the film wrapping apparatus 16 to maintain the alignment of the pallet 10 once the pallet is centered. An upper surface 24 of the support frame 22 has a plurality of conveyor rollers 26 and includes a pallet entry end 28 an opposite pallet exit end 30, a first side 32 and an opposite second side 34. The conveyor rollers 26 are mounted transverse to a direction of pallet travel "A" (FIG. 3) from the pallet entry end 28 to the pallet exit end 30. In the preferred embodiment, the conveyor rollers 26 are disposed in groups of three rollers, with relatively wider spacing between the groups in the direction of pallet travel "A" (FIG. 3).

A first pallet pusher unit 36 is associated with the first side 32 of the support frame 22 for reciprocal movement transverse to the direction of pallet travel "A", and a second pallet pusher unit 38 is associated with the second side of the support frame for reciprocal movement transverse to the direction of pallet travel. Each of the first and second pallet pusher units 36, 38 have respective pallet pusher members 40, 42 configured for directly engaging respective sides of a pallet 10 located on the conveyor rollers 26 and exerting sufficient force on the pallet 10 to center the pallet on the conveyor rollers.

Each of the pallet pusher units 36, 38 have openings 44 (FIG. 3) for accommodating the conveyor rollers 26 so that the pallet pusher units are movable transversely relative to the conveyor rollers. Also, it is preferred that the pallet pusher units 36, 38 extend substantially the entire length of the support frame 22 in the direction of travel "A". In the preferred embodiment, the pallet pusher units 36, 38 are provided with supports 46 extending in the spaces. The supports 46 are each connected to a pusher support plate 48 which is part of the pallet pusher unit 36, 38 and is disposed beneath the conveyor rollers 26.

Referring now to FIG. 5, at least one transverse U-channel rail 50 is mounted to the support frame 22 beneath the conveyor rollers 26 and defining a channel track 52. The "U"-channel rail 50 is attached to, and extends horizontally between, the sides 32, 34 of the support frame 22, and is preferably of the type sold by PBC Linear of Roscoe, Ill. under the trademark Hevi-Rail® channel rail or equivalent as is available in the art. Each of the first and second pallet pusher units 36, 38 have at least one depending bearing mount 54 constructed and arranged for alignment with the channel track 52, and each bearing mount is provided with a track bearing 56 rotatably engaging the channel track 52.

Figure 6:
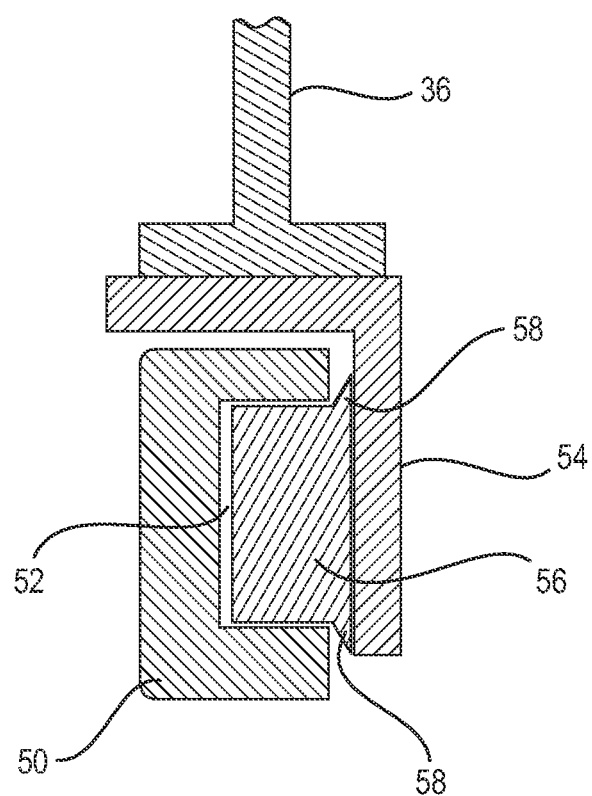
FIG. 6 is a schematic, fragmentary vertical cross-section of the present pallet centering device.

As seen in FIGS. 5 and 6, each pallet pusher unit 36, 38 has a pair of depending bearing mounts 54 having the track bearings 56 for engaging the channel track 52. In the preferred embodiment, the track bearings 56 are cam roller bearings having a flange 58 on one end for maintaining rolling alignment in the channel track 52 (FIG. 6). Also, the track bearings 56 are secured to the bearing mounts with fasteners such as bolts or the like. In a preferred embodiment, the bearings 56 are 2¾ inch size, however the size may vary to suit the application. It has been found that the use of multiple roller track bearings 56 for each pallet pusher unit 36, 38 significantly enhances the load-carrying capability of the pallet pusher unit, and facilitates centering of relatively heavy pallets 10.

Figure 7:
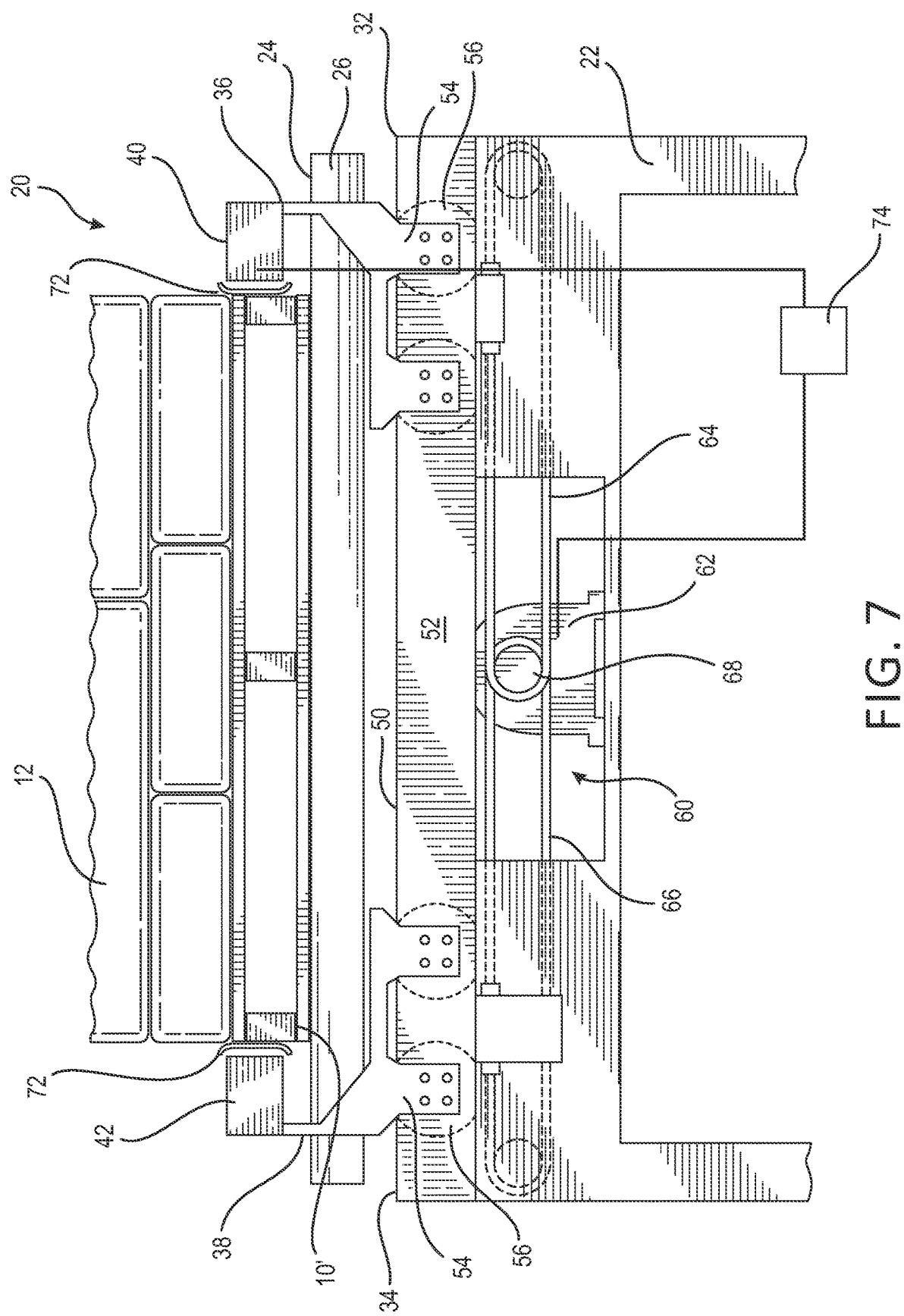
FIG. 7 is a front view of the present pallet centering device showing a centered, stacked pallet.

Referring now to FIGS. 5 and 7, a drive assembly 60 is associated with the support frame 22 and is connected to each of the first and second pallet pusher units 36, 38 for moving the units reciprocally relative to the direction of travel "A" and for centering the pallet 10' located on the conveyor rollers 26. Preferably, the drive assembly 60 includes a motor 62, such as an electric motor of the type used in the conveyor art, associated with the support frame 22 and connected to first and second power transmission members 64, 66, each of which is associated with one of the first and second pallet pusher units 36, 38. In the preferred embodiment, the power transmission members 64, 66 are endless belts or chains and are connected to a dual pulley 68 associated with the motor 62, so that energization of the motor 62 causes the reciprocal movement of the pallet pusher units 36, 38 relative to the conveyor rollers 26 depending on the rotational direction of the motor. Also, each of the pallet pusher units 36, 38 has a foot 70 that connects each unit to the respective power transmission member 64, 66 via fasteners. As shown in FIG. 5, various configurations are contemplated for the foot 70 as long as the pallet pusher unit 36, 38 is secured to the power transmission member 64, 66 for common movement.

Each pallet pusher member 40, 42 has a control flap 72 constructed and arranged so that upon impact with the pallet 10', the flap depresses against the pallet pusher member, generating a signal indicating pallet contact. A control unit 74 (FIG. 7) is connected to the pallet pusher units 36, 38 and to the drive assembly 60 and is configured for controlling movement of the pallet pusher units for achieving centering of the pallet 10' on the conveyor rollers 26. Also, the control unit 74 is optionally connected to a motor drive 76 (FIG. 3) provided for powering the conveyor rollers 26. Alternately, the motor drive 76 is independently controlled. It is contemplated that the control unit 74 is constructed and arranged for moving the pallet pusher units 36, 38 towards each other in unison for impacting and centering the subject pallet 10', or alternately the pallet pusher units are movable sequentially as needed for centering the subject pallet on the conveyor rollers 26.

While a particular embodiment of the present pallet centering device has been described herein, it will be appreciated by those skilled in the art that changes and modifications may be made thereto without departing from the invention in its broader aspects and as set forth in the following claims.

The invention claimed is:

1. A pallet centering device for use with a pallet conveyor line that is connected to a pallet film wrapping apparatus, said device comprising:
   a support frame with an upper surface upon which is mounted a plurality of conveyor rollers, said support frame including a pallet entry end, an opposite pallet exit end, a first side and an opposite second side, said conveyor rollers being mounted transverse to a direction of pallet travel from said pallet entry end to said pallet exit end;
   a first pallet pusher unit associated with said first side of said support frame for reciprocal movement transverse to the direction of pallet travel;
   a second pallet pusher unit associated with said second side of said support frame for reciprocal movement transverse to the direction of pallet travel;
   said first and second pallet pusher units each having pallet pusher members configured for engaging respective sides of a pallet located on said conveyor rollers;
   at least one transverse U-channel rail mounted to said support frame beneath said conveyor rollers and defining a channel track, said rail mounted within said support frame;
   each said first and second pallet pusher units having at least one depending bearing mount constructed and arranged for alignment with said channel track, and each said bearing mount provided with a track bearing rotatably engaging said channel track;
   a drive assembly associated with said support frame and connected to said first and second pallet pusher units for moving said units reciprocally relative to said direction of travel for centering the pallet located on said conveyor rollers.

2. The pallet centering device of claim 1, wherein each said pallet pusher unit has a pair of depending bearing mounts having track bearings for engaging said channel track.

3. The pallet centering device of claim 1, wherein each said track bearing has a flanged end for enhancing alignment in said channel track.

4. The pallet centering device of claim 1, wherein each said pallet pusher unit has a control flap constructed and arranged so that upon impact with the pallet, the flap depresses against said pallet pusher unit, generating a signal indicating pallet contact.

5. The pallet centering device of claim 4, further including a control unit connected to said pallet pusher units and to said drive assembly and configured for controlling movement of said pallet pusher units for achieving centering of the pallet on said conveyor rollers.

6. The pallet centering device of claim 1, wherein said pallet pusher units each have openings for accommodating said conveyor rollers so that said pallet pusher units are movable transversely relative to said conveyor rollers.

7. The pallet centering device of claim 6, wherein said conveyor rollers are arranged in groups, with spaces defined between said groups in the direction of pallet travel, and said pallet pusher units are provided with supports extending in said spaces.

8. The pallet centering device of claim 7, wherein said supports are connected to a pusher support plate disposed beneath said conveyor rollers.

9. The pallet centering device of claim 1, wherein said drive assembly includes a motor associated with said support frame and connected to first and second power transmission members, each of which is associated with one of said first and second pallet pusher units, so that energization of said motor causes said reciprocal movement of said pallet pusher units relative to said conveyor rollers.

10. The pallet centering device of claim 9, wherein said power transmission member is one of an endless belt and a chain, and each said first and second pallet pusher units has a foot secured to said respective power transmission member.

11. A pallet centering device for use with a pallet conveyor line that is connected to a pallet film wrapping apparatus, said device comprising:
 a support frame with an upper surface upon which is mounted a plurality of conveyor rollers, said support frame including a pallet entry end, an opposite pallet exit end, a first side and an opposite second side, said conveyor rollers being mounted transverse to a direction of pallet travel from said pallet entry end to said pallet exit end;
 a first pallet pusher unit associated with said first side of said support frame for reciprocal movement transverse to the direction of pallet travel;
 a second pallet pusher unit associated with said second side of said support frame for reciprocal movement transverse to the direction of pallet travel;
 said first and second pallet pusher units each having pallet pusher members configured for engaging respective sides of a pallet located on said conveyor rollers;
 at least one transverse U-channel rail mounted to said support frame beneath said conveyor rollers and defining a channel track, said rail mounted within said support frame;
 each said first and second pallet pusher units having at least one depending bearing mount constructed and arranged for alignment with said channel track, and each said bearing mount provided with a track bearing rotatably engaging said channel track;
 said pallet pusher units each have a pusher support plate disposed beneath said conveyor rollers and supports associated with said support plate and extending between spaces separating said conveyor rollers.

12. The pallet centering device of claim 11, further including a drive assembly associated with said support frame and connected to said first and second pallet pusher units for moving said units reciprocally relative to said direction of travel for centering the pallet located on said conveyor rollers, said drive assembly including a motor connected to first and second power transmission members, and each said pallet pusher unit includes a foot configured for attachment to said respective power transmission member.

13. The pallet centering device of claim 11, wherein each said pallet pusher units have openings for accommodating said conveyor rollers so that said pallet pusher units are movable transversely relative to said conveyor rollers.

14. A pallet centering device for use with a pallet conveyor line that is connected to a pallet film wrapping apparatus, said device comprising:
 a support frame with an upper surface upon which is mounted a plurality of conveyor rollers, said support frame including a pallet entry end, an opposite pallet exit end, a first side and an opposite second side, said conveyor rollers being mounted transverse to a direction of pallet travel from said pallet entry end to said pallet exit end;
 a first pallet pusher unit associated with said first side of said support frame for reciprocal movement transverse to the direction of pallet travel;
 a second pallet pusher unit associated with said second side of said support frame for reciprocal movement transverse to the direction of pallet travel;
 said first and second pallet pusher units each having pallet pusher members configured for impacting respective sides of a pallet located on said conveyor rollers;
 at least one transverse U-channel rail mounted to said support frame beneath said conveyor rollers and defining a channel track, said rail mounted within said support frame;
 each said first and second pallet pusher units having at least one depending bearing mount constructed and arranged for alignment with said channel track, and each said bearing mount provided with a roller track bearing secured to said bearing mount, said roller track bearing rotatably engaging said channel track; and
 a drive assembly associated with said support frame and connected to said first and second pallet pusher units for moving said units reciprocally relative to said direction of travel for centering the pallet located on said conveyor rollers, said pallet pusher units being movable sequentially as needed to center the pallet located on said conveyor rollers.

15. The pallet centering device of claim 14, wherein said drive assembly includes a motor associated with said support frame and connected to first and second power transmission members, each of which is associated with one of said first and second pallet pusher units, so that energization of said motor causes said reciprocal movement of said pallet pusher units relative to said conveyor rollers.

16. The pallet centering device of claim 15, wherein said power transmission member is one of an endless belt and a chain, and each said first and second pallet pusher units has a foot secured to said respective power transmission member.

17. The pallet centering device of claim 1, wherein said pallet pusher units each have openings for accommodating said conveyor rollers so that said pallet pusher units are movable transversely relative to said conveyor rollers.

18. The pallet centering device of claim 17, wherein said conveyor rollers are arranged in groups, with spaces defined between said groups in the direction of pallet travel and said pallet pusher units are provided with supports extending in said spaces and wherein said supports are connected to a pusher support plate disposed beneath said conveyor rollers.

19. The pallet centering device of claim 14, wherein each said pallet pusher unit has a control flap constructed and arranged so that upon impact with the pallet, the flap depresses against said pallet pusher unit, generating a signal indicating pallet contact.

* * * * *